US 7,743,414 B2

(12) United States Patent
Pouliot

(10) Patent No.: US 7,743,414 B2
(45) Date of Patent: *Jun. 22, 2010

(54) SYSTEM AND METHOD FOR EXECUTING A PERMISSIONS RECORDER ANALYZER

(75) Inventor: Sebastien Pouliot, Beauport (CA)

(73) Assignee: Novell, Inc., Provo, UT (US)

( * ) Notice: Subject to any disclaimer, the term of this patent is extended or adjusted under 35 U.S.C. 154(b) by 1062 days.

This patent is subject to a terminal disclaimer.

(21) Appl. No.: 11/441,167

(22) Filed: May 26, 2006

(65) Prior Publication Data

US 2007/0277222 A1 Nov. 29, 2007

(51) Int. Cl.
*G06F 11/00* (2006.01)
(52) U.S. Cl. .................................... 726/22; 709/224
(58) Field of Classification Search ................ None
See application file for complete search history.

(56) References Cited

U.S. PATENT DOCUMENTS

| 5,452,457 | A | 9/1995 | Alpert et al. ............... 395/700 |
| 6,071,316 | A | 6/2000 | Goossen et al. ............. 717/4 |
| 6,230,312 | B1 | 5/2001 | Hunt .......................... 717/4 |
| 6,282,701 | B1 | 8/2001 | Wygodny et al. ............ 717/4 |
| 6,308,275 | B1 | 10/2001 | Vaswani et al. ........... 713/201 |
| 6,560,774 | B1 | 5/2003 | Gordon et al. ............. 717/146 |
| 6,615,264 | B1 | 9/2003 | Stoltz et al. ................ 709/227 |
| 6,802,054 | B2 | 10/2004 | Faraj ........................ 717/128 |
| 6,871,284 | B2 | 3/2005 | Cooper et al. ............. 713/200 |
| 6,971,091 | B1 | 11/2005 | Arnold et al. .............. 717/145 |
| 7,069,554 | B1 | 6/2006 | Stammers et al. .......... 717/178 |
| 7,171,655 | B2 | 1/2007 | Gordon et al. ............. 717/146 |
| 7,487,221 | B2 | 2/2009 | Araki ........................ 709/208 |
| 7,512,965 | B1 | 3/2009 | Amdur et al. ............... 726/1 |
| 7,552,472 | B2 * | 6/2009 | Baffes et al. ................ 726/22 |
| 7,587,487 | B1 | 9/2009 | Gunturu .................... 709/224 |
| 7,590,684 | B2 | 9/2009 | Herrmann ................. 709/203 |
| 7,620,940 | B2 | 11/2009 | Goldsmith et al. ......... 717/127 |
| 2002/0042897 | A1 | 4/2002 | Klein et al. ................ 714/718 |
| 2002/0069200 | A1 | 6/2002 | Cooper et al. ............... 707/9 |
| 2002/0198675 | A1 | 12/2002 | Underseth et al. .......... 702/122 |
| 2003/0041267 | A1 * | 2/2003 | Fee et al. ................... 713/201 |
| 2003/0065942 | A1 | 4/2003 | Lineman et al. ........... 713/201 |

(Continued)

OTHER PUBLICATIONS

Clark, Jason, "Return of the Rich Client—Code Access Security and Distribution Features in .NET Enhance Client-Side Apps", *MSDN Magazine*, printed from http://msdn.microsoft.com/msdnmag/issues/02/06/rich/default.aspx, Jun. 2002, 16 pages.

(Continued)

*Primary Examiner*—Pramila Parthasarathy
(74) *Attorney, Agent, or Firm*—Pillsbury Winthrop Shaw Pittman LLP

(57) ABSTRACT

System and method for accurately determining security policy for an application based on dynamic code analysis of application runtime execution(s). A dynamic recorder, dynamic code analyzer and security policy analyzer can evaluate and determine the security decisions and access to secure resources made during a security event within one or more executions of an application in order to identify an existing security policy that best matches an application's security needs. Security events may be analyzed to determine which security decisions and access to secure resources are necessary and which can be eliminated or replaced with alternative decisions or resources.

26 Claims, 2 Drawing Sheets

U.S. PATENT DOCUMENTS

| | | | |
|---|---|---|---|
| 2003/0110192 A1 | 6/2003 | Valente et al. | 707/513 |
| 2003/0115484 A1 | 6/2003 | Moriconi et al. | 713/201 |
| 2003/0177355 A1 | 9/2003 | Elgressy et al. | 713/167 |
| 2003/0196114 A1 | 10/2003 | Brew et al. | 713/201 |
| 2003/0225822 A1 | 12/2003 | Olson et al. | 709/202 |
| 2004/0103323 A1 | 5/2004 | Dominic | 713/202 |
| 2004/0250112 A1 | 12/2004 | Valente et al. | 713/200 |
| 2005/0071668 A1 | 3/2005 | Yoon et al. | 713/200 |
| 2005/0172126 A1 | 8/2005 | Lange et al. | 713/166 |
| 2005/0240999 A1 | 10/2005 | Rubin et al. | 726/22 |
| 2005/0262517 A1 | 11/2005 | French | 719/316 |
| 2006/0064737 A1* | 3/2006 | Wallace | 726/1 |
| 2006/0117299 A1 | 6/2006 | Goldsmith et al. | 717/124 |
| 2006/0143396 A1 | 6/2006 | Cabot | 711/134 |
| 2006/0150021 A1 | 7/2006 | Traskov et al. | 714/37 |
| 2006/0235655 A1 | 10/2006 | Qing et al. | 702/186 |

OTHER PUBLICATIONS

Mono, "Mono:Runtime—The Mono Runtime", printed from http://www.mono-project.com/Mono:Runtime, Jan. 24, 2006, 8 pages.

Mono, "Assemblies and the GAC—How Mono Finds Assemblies", printed from http://www.mono-project.com/Assemblies_and_the_GAC, Jul. 20, 2005, 11 pages.

Meier, J.D., et al., "How to: Perform a Security Code Review for Managed Code (Baseline Activity)", printed from http://msdn.microsoft.com/library/en-us/dnpag2/html/paght000027.asp?frame=true, Microsoft Corporation, Oct. 2005, 13 pages.

Damianou, Nicodemos C., "A Policy Framework for Management of Distributed Systems", Thesis, Imperial College of Science, Technology and Medicine, University of London, Department of Computing, Feb. 2002, 233 pages.

Oaks, Scott, "Java Security, $2^{nd}$ Edition", Publisher O'Reilly Media, Inc., May 17, 2001, 22 pages.

Sundmark et al., "Monitored Software Components—A Novel Software Engineering Approach", *Proceedings of the $11^{th}$ Asia-Pacific Software Engineering Conference* (APSEC'04), Nov. 30-Dec. 3, 2004, pp. 624-631.

Sokolsky et al., "Steering of Real-Time Systems Based on Monitoring and Checking", *Proceedings of the Fifth International Workshop*, Nov. 18-20, 1999, pp. 11-18.

* cited by examiner

SYSTEM AND METHOD FOR EXECUTING A PERMISSIONS RECORDER ANALYZER

FIELD OF INVENTION

The present invention is a computer implemented dynamic code analyzer for accurately determining "perfect-fit" and/or "best-fit" security policies that define an application runtime.

BACKGROUND

Development of computer applications usually involves evaluating potential security issues before application code is made available to customers. Static code analyzers have been used to check for these security issues. Static code checkers check that coding standards are upheld, and mark code that is potentially harmful and thus likely to be more error prone. Harmful code may be an unprotected sequence of code leading to program vulnerabilities. A Static Code Analyzer can help developers detect coding and security related issues earlier in the development cycle thereby reducing the overall cost of fixing code defects.

Many computer-implemented applications require access to external resources (e.g. data files, access to the Internet) in order to execute properly. Evidence from the application (e.g., code characteristics) presented at runtime can determine which security policy should control the application's access to external resources and other security related issues. The evidence is based either on the code identity, such as code characteristics including among other things, digital signature, application directory, hash, publisher, site of origin, URL of origin, zone of origin, and/or with custom supplied evidences. Once a security policy is selected, a security manager can enforce the policy when executing the application.

Current implementations are ineffective because static code analyzers easily overestimate the required permissions for access to external resources (e.g., shared code between applications) because they consider the whole application (e.g., one time initialization, administrative options) and not the parts that are really being executed by the end user. Thus static analyzers are not able to identify the best security policy target for an application. Inaccurate security permissions may result in application code unnecessarily being allowed permissions and access to secure resources (e.g., granting too much permission). This is especially a concern when many applications run in highly secure environments, where the permissions should be as minimal as possible. There exists a need for limiting software application permissions more accurately and effectively.

SUMMARY OF THE INVENTION

Various aspects of the invention overcome at least some of these and other drawbacks of known systems. According to one embodiment of the invention, a system and method provides dynamic code analysis for logged execution data, identifying security related events from the logged execution data, and determining a security policy that corresponds to the identified security related events of the execution. This may be referred to as a "perfect fit" security policy.

According to another aspect of the invention, the identified perfect-fit security policy can be compared to existing security policies including system defaults in order to identify a minimal superset to the perfect fit security policy from the existing security policies. This superset may be referred to as a "best-fit" security policy, which allows the application to run as normal and avoids having to create excess security policies that need to be managed.

According to another aspect of the invention, a system may be used for further determining whether security permission(s) may be replaced with more restrictive security permission(s) without, affecting the application's functions. Changes may be determined by analyzing the recorded logs associated with the original security permission(s). This determination may result in a list of suggested security changes for the running application. These suggested changes, which may be implemented by modifying the application source code, can be put through the same process (for a single or for multiple iterations), which will yield a more accurate and secure security policy. Therefore, modification to the application source code can result in a different set of permissions to execute, with the same or very similar results.

The system and method of the invention allows more effective and accurate assessment of application security requirements. This allows the selection of the best existing policy or, if required, to build a custom security policy for the application. More restrictive security policies may be associated with the application while still allowing the application to continue to work properly without unnecessarily exposing secure resources.

These and other objects, features and advantages of the invention will be apparent through the detailed description of the embodiments and the drawings attached hereto. It is also to be understood that both the foregoing general description and the following detailed description are exemplary and not restrictive of the scope of the invention.

DETAILED DESCRIPTION

The present invention offers a method for obtaining more accurate information about the security permissions required by an application to run. The required permissions to execute properly are a subset of the all the permissions that can be required by the application (e.g. setup code, configuration, administrative tasks). Analysis on dynamically recorded application execution data can identify the executed permissions and the context in which they are executed. In comparison, a static analysis will detect, indiscriminately, all permissions and, even then, misses the permission required if some code is loaded dynamically. The gathered information (i.e. evidences, permissions, context) can be used to determine an application specific security policy or the best match to a pre-existing security policy. As such, many factors may be considered in assigning a security policy. A security policy may be characteristic of the permissions that an application is allowed to have. A permission set and security policy may be determined based on various factors of the application's runtime.

Figure 1:
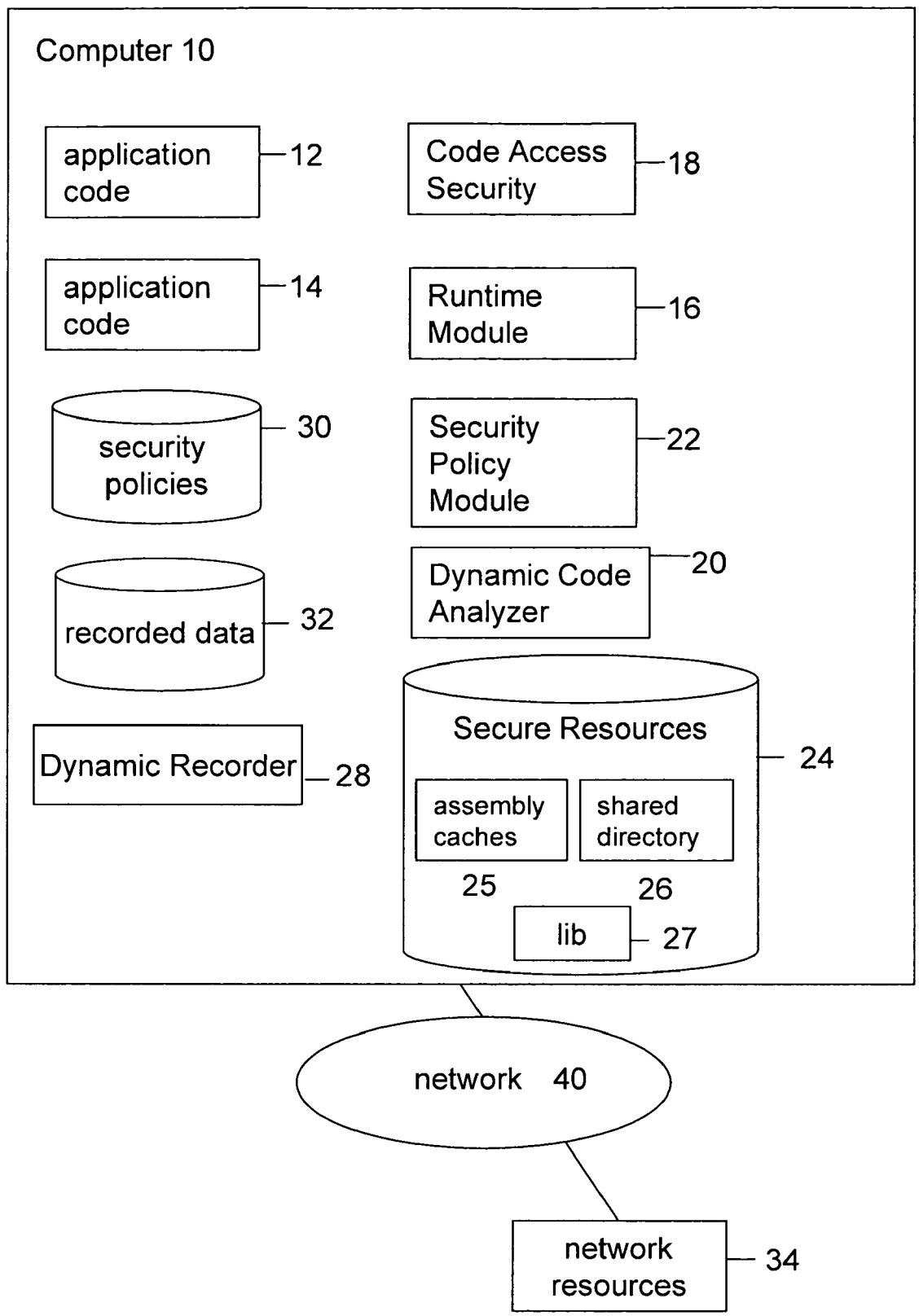
FIG. 1 is a high-level block diagram, according to an embodiment of the invention.

FIG. 1 is a high-level block diagram of an exemplary system for a method of the invention. One or more applications may be presented for execution on a computer 10. Application code (12, 14) may be downloaded to a computer 10 through a network connection. Other application sources may be included (e.g., hard disk, CD, drive storage). Thus, application code (12, 14) on a computer 10 may originate from various sources that are either secure, un-secure, or semi-secure.

Execution of applications may be carried out using a runtime module 16 (e.g., Common Language Runtime, ECMA runtime, etc.). Code Access Security (CAS) 18 allows the runtime module 16 to restrict the permissions allowed to an application based on the applicable security policy or policies. Runtime module 16 and CAS 18 are generally known in the art. A novel aspect of the system includes the dynamic recorder 28, records database 32, dynamic code analyzer 20 and the security policy module 22. A dynamic recorder 28 may dynamically record permission related data (e.g., access requests, edit, write, store, delete permissions), context related data, and evidence related data that occurs during application code execution to a records database 32. Multiple execution instances may be recorded in order to analyze the application more completely. Database 32, or other location, may store dynamically record data from application execution runtime. The application execution data may include, but is not limited to, information from each resource the application invoked during execution including permission checks (e.g., Link, Inheritance and Demand); the data used in the security decision process (e.g. stack); and the results (e.g., success or failure); the evidence of the executing code, the XML representation of the requested permissions; access to secure resources 24 including shared directories 26, assembly cache 25, and/or code libraries 27. Resource access to other sources may also exist. The recorded data may be characterized into events and recorded for further analysis. The data may be sent to a remote location if desired.

The dynamic code analyzer 20 and the security policy module 22 interpret the recorded data. The dynamic code analyzer 20 may parse the dynamically collected data to identify various security and/or other observed events. The dynamic code analyzer 20 may also interpret the recorded permissions, among other things, into useful information regarding security. Security policy module 22 may further process the information from the dynamic code analyzer 20 to determine a minimal security policy for executing the application. A minimal security policy may be defined by the most restrictive security policy that still allows the application to execute normally. The security policy module 22 may create a minimal security policy using one or a combination of implementations including perfect fit, best fit and incorporating suggested changes. Information regarding a created security policy and/or previously created security policy (e.g., existing security policies) may be stored at security policies database 30, or other location.

A perfect fit security policy may utilize a dynamic code analyzer 20 to analyze logged execution data. The dynamically recorded execution(s) may be analyzed to identify one or more security related events associated with application execution. A security policy module 22 may create a security policy corresponding to the identified one or more security related events of the recorded execution. Thus, the perfect fit security policy is determined based on each application's unique execution events.

A best fit security policy may be determined based on comparing and matching a pre-existing security policy to the recorded execution and/or the determined perfect fit security policy. For example, a perfect fit security policy may be compared with existing policies, including system defaults, in order to identify an existing policy that provides a minimal superset to the perfect fit policy. This allows the application to be matched to an existing policy without limiting any functions of the application and avoids having to create an entirely new security policy for each application, which in turn the computer system has to store and manage. If the only matching existing security policy is found to be a security policy with the least secure permissions as compared with other existing policies (e.g., Full Trust), then a match may not be recognized. This may allow the creation of a new security policy to be established having greater permissions than the least secure permissions policy but less than or equal to the permissions required. In essence, the new policy may be created between the two. However, in some cases the policy with the least secure permissions may be used as a valid minimal superset.

Even after the matching process it is still possible to have a suboptimal security policy (e.g. the perfect-fit policy requires too many permissions or the best-fit policy allows too many permissions). To further change the security policy may require a change to the permissions themselves. This may not be done directly as the permissions are requested by the events generated by the applications. However, the events themselves can be analyzed and alternative programming solutions, leading to similar events but with different security requirements, can be suggested (e.g., suggesting the use of isolated storage instead of the normal file based storage). Determination of alternatives may result in a list of suggested security changes for the running application. Once the suggested changes are applied to the application (by making changes to the source code) the whole process can be started again. The suggested changes, if implemented, will yield a more accurate and secure security policy when combined with the perfect fit policy or identified best fit security policy. It is possible, but not necessary, to iterate this process several times until no more changes can be applied to the application source code.

Alternatively, more restrictive security permissions may be selected that do limit the application's functions, but do not render the application fully unusable. For example, an application which results in incoming access to secure resources 24 from an outside source (e.g., the Internet) may be prevented, while outgoing access from the computer 10 may still be allowed. Thus an application may have limited ability without disabling all application capabilities.

Figure 2:
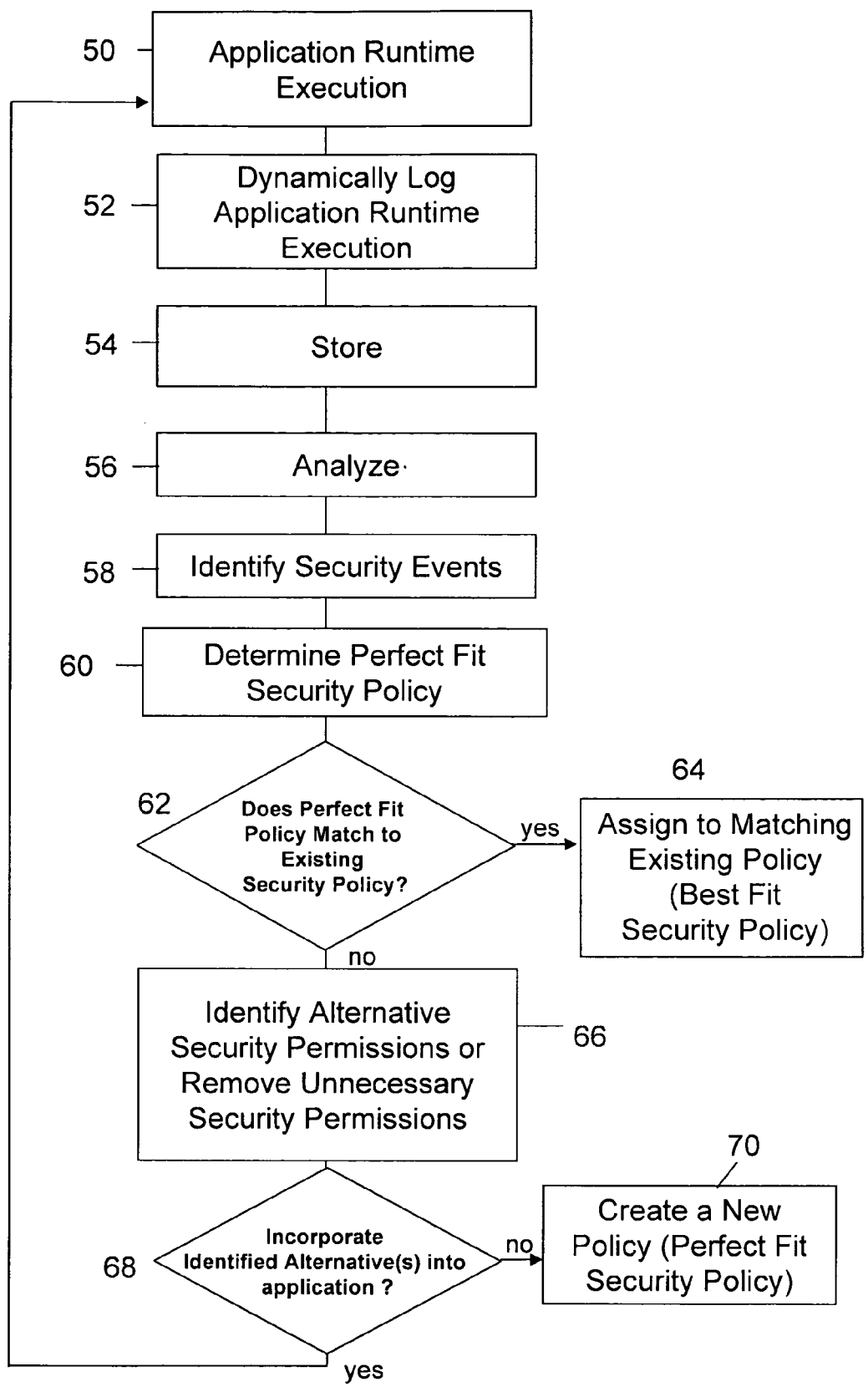
FIG. 2 is a flow diagram according to an embodiment of the invention.

FIG. 2 is a flow diagram that illustrates a method of the invention according to an embodiment of the invention. At runtime execution an application may proceed to execute on the computer 10 (operation 50). During application runtime execution, data associated with the actions and events of application runtime execution are recorded and stored (operation 52 and 54). At operation 56, analysis may include parsing the data from one or more application runtime execution instances. The security events and/or other runtime actions may be identified in analysis, which may be carried out to varying degrees. Information about the identified events, particularly security events, may be further processed to determine a security policy (operation 58). In operation 60, a perfect fit security policy may be determined. The perfect fit security policy may be matched with one or more existing security policies (operation 62). A match may be determined based on whether an existing security policy is a superset of the determined perfect fit security policy. The matching existing policy that is the minimal superset (e.g., the superset the closest to the perfect-fit policy), is identified as the best fit policy for which the application gets assigned (operation 64). However, if the superset is too large, (e.g., too few permissions) then a good match may not be recognized. Operation 66 may identify, based on logged runtime data (e.g., security events), possible changes to the application that, if implemented, would reduce the security requirements for executing the application, without affecting its capabilities. For example, alternative suggestions may include, using Isolated Storage versus normal file access; accessing "safe" intranet resources instead of similar public internet resources; using managed resources instead of invoking native code and/or; asserting certain permissions that are know to be safe in the particular context. Furthermore, upon analysis, if a permission request is found to be unnecessary it may be eliminated.

The alternatives may be suggested to the user so that a developer (or other entity) may determine whether it is possible to incorporate one or more of them into the application (operation 68). If so, the method may return to operation 50 and restart analyzing the new application with all, or some of, the suggested changes. Such iterations may be done multiple times for an application until there are no more changes judged acceptable to the developer. Otherwise, a new security policy may be created and stored for use with the application (operation 70). For subsequent processing of application security policies, the security policy created in operation 70 may be referred to as an existing security policy.

Thus, the method described may be used to determine whether an application can properly execute using reduced permissions. This allows permissions to be mapped into the existing policy that best fits the permissions set needed for an application to run successfully. Also based on information logged and evaluated using a dynamic recorder 28, dynamic code analyzer 20 and security policy module 22 an accurate specific security policy may be created for the application and stored at security policy database 30. Thus, the system and method of the invention provides a less complex method for managing security policies while providing a more accurate security policy for applications.

In the foregoing specification, the invention has been described with reference to specific embodiments thereof. Various modifications and changes may be made thereto without departing from the broader spirit and scope of the invention. The specification and drawings are, accordingly, to be regarded in an illustrative rather than a restrictive sense.

I claim:

1. A computer implemented method for determining a security policy based on execution of application code, comprising:
   executing an application in a runtime module on a computer;
   dynamically logging runtime execution data for the application during the execution of the application in the runtime module;
   identifying one or more security related events generated during the execution of the application from the dynamically logged runtime execution data for the application;
   determining a minimal security policy for the application from the one or more security related events generated during the execution of the application;
   determining whether an existing security policy contained in a database coupled to the computer matches the minimal security policy determined for the application;
   suggesting the existing security policy for the application in response to determining that the existing security policy contained in the database matches the minimal security policy determined for the application; and
   creating a new security policy for the application in response to determining that the existing security policy contained in the database does not match the minimal security policy determined for the application.

2. The computer implemented method of claim 1, wherein the existing security policy contained in the database does not match the minimal security policy determined for the application if the existing security policy comprises permissions that are less than permissions that the minimal security policy requires.

3. The computer implemented method of claim 2, further comprising suggesting one or more security changes for the application in response to determining that the permissions in the existing security policy are less than the permissions that the minimal security policy requires, wherein the security changes suggested for the application reduce one or more security requirements associated with the permissions that the minimal security policy requires.

4. The computer implemented method of claim 3, wherein the suggested security changes include alternative programming solutions having the reduced security requirements, and wherein the alternative programming solutions lead to events that are similar to the security related events generated during the execution of the application.

5. The computer implemented method of claim 4, wherein the alternative programming solutions do not limit functionality associated with the application.

6. The computer implemented method of claim 4, wherein the alternative programming solutions limit functionality associated with the application without rendering the application unusable.

7. The computer implemented method of claim 2, wherein the new security policy comprises permissions that are greater than the permissions in the existing security policy and less than or equal to the permissions that the minimal security policy requires.

8. The computer implemented method of claim 1, wherein the dynamically logged runtime execution data comprises runtime execution data dynamically logged for one or more execution instances of the application.

9. The computer implemented method of claim 1, wherein the existing security policy contained in the database matches the minimal security policy determined for the application if the existing security policy comprises permissions that are a valid minimal superset relative to permissions that the minimal security policy requires.

10. The computer implemented method of claim 1, wherein the one or more security related events include at least one of evidence of code for executing the application in the runtime module, one or more permissions requests by the application, one or more results of the one or more permission requests, one or more attempts to access one or more secure resources by the application, or one or more requests to access a resource by the application.

11. The computer implemented method of claim 10, wherein the one or more secure resources include one or more of a shared directory, an assembly cache, or a code library.

12. The computer implemented method of claim 1, further comprising storing the dynamically logged runtime execution data in a memory coupled to the computer.

13. The computer implemented method of claim 1, wherein the existing security policy contained in the database does not match the minimal security policy determined for the application if the existing security policy comprises permissions that are greater than permissions that the minimal security policy requires.

14. A computer implemented system for determining a security policy based on execution of application code, comprising:
   a computer comprising at least one processor configured to execute an application, wherein the application comprises computer executable instructions stored in a memory coupled to the computer;
   a runtime module configured to execute the application on the computer;

a dynamic recorder configured to dynamically log runtime execution data for the application during the execution of the application in the runtime module;

a dynamic code analyzer that receives the dynamically logged runtime execution data for the application from the dynamic recorder, wherein the dynamic code analyzer is configured to:

identify one or more security related events generated during the execution of the application from the dynamically logged runtime execution data for the application; and determine a minimal security policy for the application from the one or more security related events generated during the execution of the application; and a security policy module that receives the minimal security policy determined for the application from the dynamic code analyzer, wherein the security policy module is configured to:

determine whether an existing security policy contained in a database coupled to the computer matches the minimal security policy determined for the application;

suggest the existing security policy for the application in response to determining that the existing security policy contained in the database matches the minimal security policy determined for the application; and create a new security policy for the application in response to determining that the existing security policy contained in the database does not match the minimal security policy determined for the application.

15. The computer implemented system of claim 14, wherein the security policy module is configured to determine that the existing security policy contained in the database does not match the minimal security policy determined for the application if the existing security policy comprises permissions that are less than permissions that the minimal security policy requires.

16. The computer implemented system of claim 15, wherein the security policy module is further configured to suggest one or more security changes for the application in response to determining that the permissions in the existing security policy are less than the permissions that the minimal security policy requires, wherein the security changes suggested for the application reduce one or more security requirements associated with the permissions that the minimal security policy requires.

17. The computer implemented system of claim 16, wherein the suggested security changes include alternative programming solutions having the reduced security requirements, and wherein the alternative programming solutions lead to events that are similar to the security related events generated during the execution of the application.

18. The computer implemented system of claim 17, wherein the alternative programming solutions do not limit functionality associated with the application.

19. The computer implemented system of claim 17, wherein the alternative programming solutions limit functionality associated with the application without rendering the application unusable.

20. The computer implemented system of claim 15, wherein the new security policy comprises permissions that are greater than the permissions in the existing security policy and less than or equal to the permissions that the minimal security policy requires.

21. The computer implemented system of claim 14, wherein the dynamically logged runtime execution data comprises runtime execution data dynamically logged for one or more execution instances of the application.

22. The computer implemented system of claim 14, wherein the existing security policy contained in the database matches the minimal security policy determined for the application if the existing security policy comprises permissions that are a valid minimal superset relative to permissions that the minimal security policy requires.

23. The computer implemented system of claim 14, wherein the one or more security related events include at least one of evidence of code for executing the application in the runtime module, one or more permissions requests by the application, one or more results of the one or more permission requests, one or more attempts to access one or more secure resources by the application, or one or more requests to access a resource by the application.

24. The computer implemented system of claim 23, wherein the one or more secure resources include one or more of a shared directory, an assembly cache, or a code library.

25. The computer implemented system of claim 14, wherein the dynamic recorder is further configured to store the dynamically logged runtime execution data in the memory coupled to the computer.

26. The computer implemented system of claim 14, wherein the security policy module is configured to determine that the existing security policy contained in the database does not match the minimal security policy determined for the application if the existing security policy comprises permissions that are greater than permissions that the minimal security policy requires.

* * * * *